(12) United States Patent
Jindal et al.

(10) Patent No.: US 8,868,989 B2
(45) Date of Patent: Oct. 21, 2014

(54) SYSTEM FOR TESTING ERROR DETECTION CIRCUITS

(75) Inventors: Amit Jindal, Sonipat (IN); Nitin Singh, New Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 210 days.

(21) Appl. No.: 13/547,049

(22) Filed: Jul. 12, 2012

(65) Prior Publication Data

US 2014/0019818 A1    Jan. 16, 2014

(51) Int. Cl.
*G06F 11/00* (2006.01)
*G01R 31/28* (2006.01)
*G06F 11/22* (2006.01)

(52) U.S. Cl.
CPC .................................. *G06F 11/2215* (2013.01)
USPC .............................. 714/703; 714/41; 714/726

(58) Field of Classification Search
None
See application file for complete search history.

(56) References Cited

U.S. PATENT DOCUMENTS

| | | | |
|---|---|---|---|
| 4,471,484 | A | 9/1984 | Sedmak |
| 4,924,398 | A | 5/1990 | Fujiwara |
| 4,967,347 | A * | 10/1990 | Smith et al. ..................... 714/12 |
| 4,996,688 | A | 2/1991 | Byers et al. |
| 5,744,946 | A | 4/1998 | Lucas |
| 5,748,873 | A * | 5/1998 | Ohguro et al. .................. 714/11 |
| 6,092,217 | A * | 7/2000 | Kanekawa et al. ............ 714/11 |
| 7,383,490 | B2 * | 6/2008 | Almasi et al. ................. 714/800 |
| 7,428,694 | B2 | 9/2008 | Pistoulet |
| 7,444,267 | B2 | 10/2008 | Hagerott |
| 7,472,051 | B2 | 12/2008 | Mariani |
| 8,423,836 | B2 * | 4/2013 | Sautter et al. ................. 714/703 |
| 2006/0107157 | A1 * | 5/2006 | Wen et al. ..................... 714/741 |
| 2010/0218058 | A1 * | 8/2010 | Somasundaram et al. .... 714/724 |
| 2011/0029828 | A1 * | 2/2011 | Bancel et al. ................. 714/724 |

* cited by examiner

*Primary Examiner* — Daniel McMahon
(74) *Attorney, Agent, or Firm* — Charles Bergere

(57) ABSTRACT

A system for testing an error detection circuit includes a fault injection unit for operating the error detection circuit in a fault injection mode. A fault is inserted in either of a primary or a redundant processor. Output signals generated by the primary and redundant processors are compared and checked for a mismatch and the error detection circuit outputs a test signal based on the comparison result.

17 Claims, 3 Drawing Sheets

SYSTEM FOR TESTING ERROR DETECTION CIRCUITS

BACKGROUND OF THE INVENTION

The present invention relates generally to testing electronic circuits, and, more particularly, to a system for testing error detection circuits.

In recent years, advancements in the field of technology have resulted in electrical and electronic systems becoming an integral part of automobiles. Automobiles are equipped with microcontrollers (also known as engine control units or ECUs) that control many various functions of the automobile. An ECU receives inputs from sensors mounted on different parts of the automobile. For example, a crankshaft position sensor transmits the angular position of the crankshaft to the ECU, based on which the ECU controls fuel injection and spark plug firing. Various other sensors are provided for sensing pressure, speed, and temperature of different automobile parts, which allow the ECU to control other functions of the automobile.

Automotive ECUs are required to comply with stringent safety regulations that require monitoring of the sensor inputs and the automotive control systems to ensure that a precise output is generated for a given set of inputs. A conventional method for monitoring the sensor inputs involves using a redundant channel that includes a processor core, a bus, an interrupt controller, a memory controller, and other processor core related modules, in addition to a primary channel. The redundant channel functions in lock-step with the primary channel and replicates the calculations performed by the primary channel based on the sensor inputs. The outputs produced by the primary and redundant channels at different stages of processing are tested for equality by error detection circuits, such as a redundancy control and checker unit (RCCU). An RCCU detects deviation in the outputs at any stage of processing and issues a warning about a potential malfunction.

One conventional scheme for testing error detection circuits uses a microcontroller and a board level scan/set circuitry for inserting and capturing faults in the error detection circuits. The microcontroller uses a pre-stored program to inject and capture faults. Another conventional scheme uses an automated fixture that enables a robot arm mechanism to position a probe at a designated test node of an error detection circuit being tested and apply fault signals thereto. The above schemes for testing error detection circuits require additional testing equipment (i.e., the microcontroller and the robotic arm mechanism), which entails high manufacturing costs. Additionally, such testing schemes are used to test the circuits post-manufacturing and before shipping, which makes it difficult to detect any malfunction during the operational life of the error detection circuits.

Therefore, it would be advantageous to have a system for testing error detection circuits that is capable of detecting malfunctions during the operational life of the error detection circuits that is inexpensive and that overcomes the above-mentioned limitations of conventional test systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
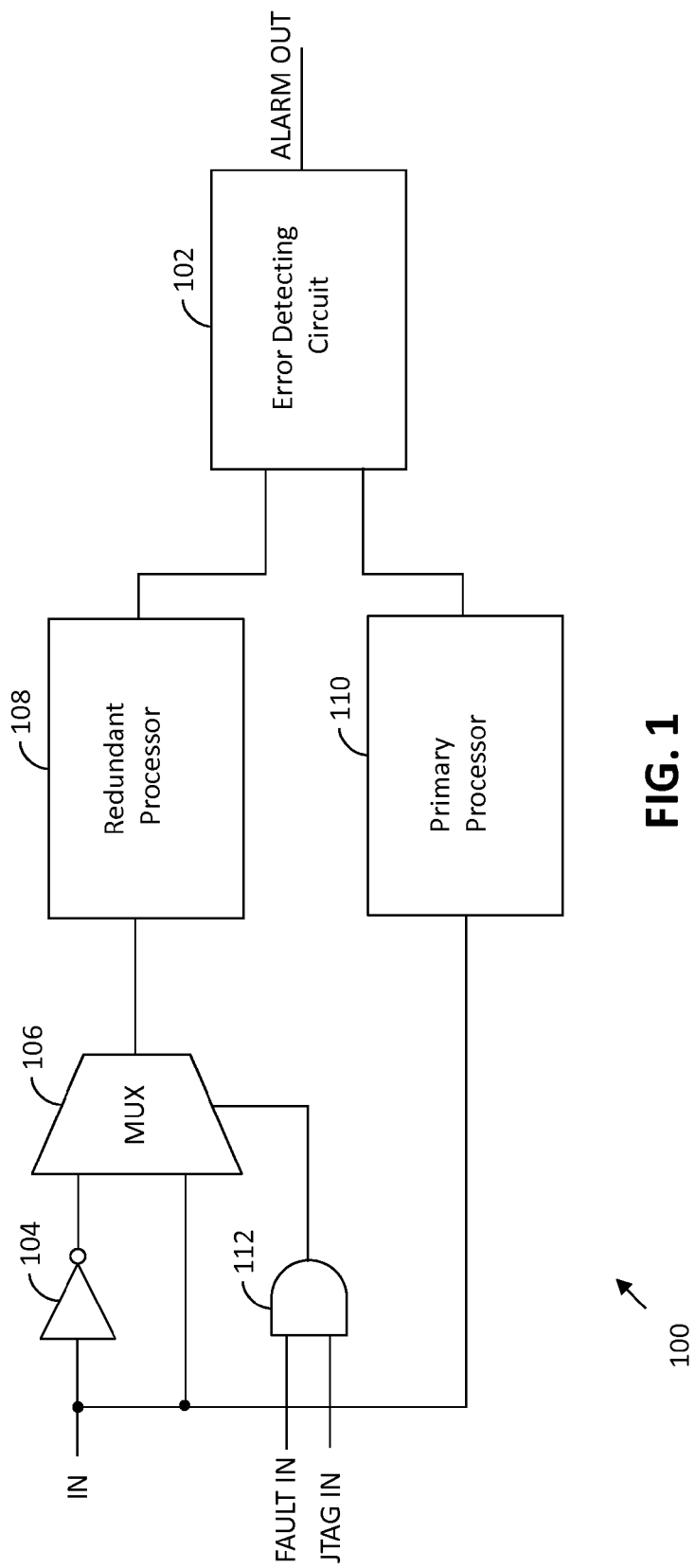
FIG. 1 is a schematic diagram depicting a system for testing an error detection circuit by injecting a fault therein, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. In the description hereinafter, the term multiplexer has been abbreviated as mux.

In an embodiment of the present invention, a system for testing an error detection circuit by injecting a fault therein is provided. The error detection circuit receives first and second output signals generated by first and second processors, respectively, and detects errors therein. The system includes a NOT gate for receiving an input signal and generating an inverted input signal, an AND gate for receiving test mode and fault injection mode signals and generating an input selection signal, and a mux. The mux has a first input terminal that receives at least one of the input and scan input signals, a second input terminal connected to the NOT gate for receiving the inverted input signal, and a select input terminal connected to the AND gate for receiving the input selection signal. The mux selectively provides at least one of the input, scan input, and inverted input signals at an output terminal thereof. The output terminal of the mux is connected to the second processor. The second processor generates the second output signal based on at least one of the input and inverted input signals and the first processor generates the first output signal based on the input signal. The error detection circuit generates an error signal when the first and second output signals are not identical.

In another embodiment of the present invention, a system for testing an error detection circuit by injecting a fault therein is provided. The error detection circuit receives first and second output signals generated by first and second processors, respectively, and detects errors therein. The system includes a NOT gate for receiving an input signal and generating an inverted input signal, an AND gate for receiving test mode and fault injection mode signals and generating an input selection signal, and a mux. The mux has a first input terminal connected to the NOT gate for receiving the inverted input signal, a second input terminal for receiving a scan input signal, and a select input terminal connected to the AND gate for receiving the input selection signal. The mux selectively provides at least one of the inverted input and scan input signals at an output terminal thereof. The system further includes an OR gate having a first input terminal connected to an output terminal of the AND gate for receiving the input selection signal and a second input terminal for receiving a scan mode enable signal. The OR gate generates a mode selection signal. The system further includes a flip-flop, having a data input terminal for receiving the input signal, a test input terminal connected to the output terminal of the mux for receiving at least one of the scan input and inverted input signals, a scan enable terminal connected to an output terminal of the OR gate for receiving the mode selection signal, and a clock input terminal for receiving a clock input signal. The flip-flop generates and transmits an intermediate signal to the second processor. The second processor generates the second output signal based on the intermediate signal and the first processor generates the first output signal based on the input signal. The error detection circuit generates an error signal when the first and second output signals are not identical.

In yet another embodiment of the present invention, a system for testing an error detection circuit by injecting a fault therein is provided. The error detection circuit receives first and second output signals generated by first and second processors, respectively, and detects errors therein. The system includes a NOT gate for receiving an input signal and generating an inverted input signal, an AND gate for receiving test mode and fault injection mode signals and generating an input selection signal, and a mux. The mux has a first input terminal for receiving the input signal, a second input terminal connected to the NOT gate for receiving the inverted input signal, and a select input terminal connected to the AND gate for receiving the input selection signal. The mux selectively provides at least one of the input and inverted input signals at an output terminal thereof. The system further includes a flip-flop having a data input terminal connected to the output terminal of the mux for receiving at least one of the input and inverted input signals, a test input terminal for receiving a scan input signal, a scan enable terminal for receiving a scan mode enable signal, and a clock input terminal for receiving a clock input signal. The flip-flop generates and transmits an intermediate signal to the second processor. The second processor generates the second output signal based on the intermediate signal and the first processor generates the first output signal based on the input signal. The error detection circuit generates an error signal when the first and second output signals are not identical.

Various embodiments of the present invention provide a system for testing an error detection circuit. The system functions in a fault injection mode and injects a fault in either of the primary and redundant processors, i.e., provides an inverted input signal to one of the primary and redundant processors, which otherwise receive identical input signals. As a result, the output signals generated by the primary and redundant processors do not match and the error detection circuit generates an error signal. If the error detection circuit fails to generate the error signal, it is deemed faulty. The above system for testing error detection circuits requires minor alterations (usage of a few additional logic gates) to device design and provides a cost-effective testing scheme with a minimal increase in the device cost. Additionally, the above system can capture faults that may occur over the entire life cycle of the device and can be used to test devices before shipping to consumers as well as during their operational life. The system of the present invention may be activated by an ECU when the automobile ignition is switched-on. The system runs a check to identify faults in the error detection circuits and accordingly issues an alert. The system may also be activated periodically by the ECU during the operation of the automobile to ensure immediate capture of faults that occur in the error detection circuit.

Referring now to FIG. 1, a schematic diagram depicting a system 100 for testing an error detection circuit 102 by injecting a fault therein, in accordance with an embodiment of the present invention, is shown. The system 100 includes a NOT gate 104, a mux 106, a redundant processor 108, a primary processor 110, and an AND gate 112.

An input terminal of the NOT gate 104 receives an input signal, such as a sensor input signal generated by a position sensor, a pressure sensor, or a temperature sensor that is mounted on different parts of an automobile and that enables an ECU to control the functioning of the automobile. The NOT gate 104 generates an inverted input signal at an output terminal thereof, based on the input signal. A first input terminal of the mux 106 is connected to the output terminal of the NOT gate 104 and receives the inverted input signal. A second input terminal of the mux 106 receives the input signal and a select input terminal of the mux 106 is connected to the AND gate 112. The AND gate 112 receives test and fault injection mode signals and generates an input selection signal, which is provided to the select input terminal of the mux 106. The mux 106 selects one of the input and inverted input signals based on the input selection signal and transmits the selected signal to the redundant processor 108. The redundant processor 108 is connected to the error detection circuit 102 and processes the signal received from the mux 106 to generate a second output signal, which is transmitted to the error detection circuit 102.

The primary processor 110 is connected to the error detection circuit 102 and receives and processes the input signal to generate a first output signal, which is transmitted to the error detection circuit 102. The error detection circuit 102 compares the first and second output signals to generate an error signal (ALARM_OUT) if the first and second output signals are not identical.

In various embodiments of the present invention, an external testing apparatus initiates a fault injection mode on the system 100 for testing the accuracy of operation of the error detection circuit 102 by checking if the error signal is generated correctly when the first and second output signals are not identical. Upon initiating the fault injection mode, the external testing apparatus drives the fault injection and test mode signals to a logic high state by providing a logic high input to a joint test action group (JTAG) register (not shown) by way of a JTAG port (not shown). The JTAG register and JTAG port are located on a system-on-a-chip (SoC) on which the system 100 is integrated. In an embodiment of the present invention, the test mode signal is programmed by providing input values to the JTAG register by way of the JTAG port. Logic high states of the fault mode injection and test mode signals drive the input selection signal to a logic high state and cause the mux 106 to select the inverted input signal. The inverted input signal is transmitted to the redundant processor 108 that generates the second output signal after processing the inverted input signal. Additionally, the primary processor 110 is provided with the input signal during the fault injection mode. The primary processor 110 processes the input signal to generate the first output signal. The first and second output signals are provided to the error detection circuit 102 by the primary and redundant processors 108 and 106, respectively.

It will be understood by a person skilled in the art that in a normal functional mode, the redundant and primary processors 106 and 108 are provided identical input signals that cause the first and second output signals to be identical if the redundant and primary processors 106 and 108 function without any error. The input signal provided to the redundant processor 108 is inverted during the fault injection mode, due to which the first and second output signals are not identical. The non-identical first and second output signals generated during the fault injection mode are provided to the error detection circuit 102 for testing the functional accuracy thereof. If the error detection circuit 102 functions correctly, it generates the error signal indicating that an error has occurred in the redundant processor 108 or the primary processor 110. If the error detection circuit 102 fails to generate the error signal, it is considered faulty.

In an embodiment of the present invention, the error detection circuit 102 is a redundancy checker circuit that is used in an automobile safety device and the fault injection mode is executed as a self-test by an automobile ECU upon ignition. The fault injection mode may be repeated periodically by the ECU during functional operation of the automobile safety device to capture faults occurring in the error detection circuit 102 immediately. The redundant and primary processors 106 and 108 may be a part of redundant and primary channels in which each channel includes a processor core, a bus, an interrupt controller, a memory controller, and other processor core-related modules. The redundant and primary channels may include multiple error detection circuits that compare outputs of redundant and primary processors at critical stages of the redundant and primary channels. In an embodiment of the present invention, the error detection circuit 102 is used in a system that includes primary and redundant channels for ensuring safe operation of the system.

Figure 2:
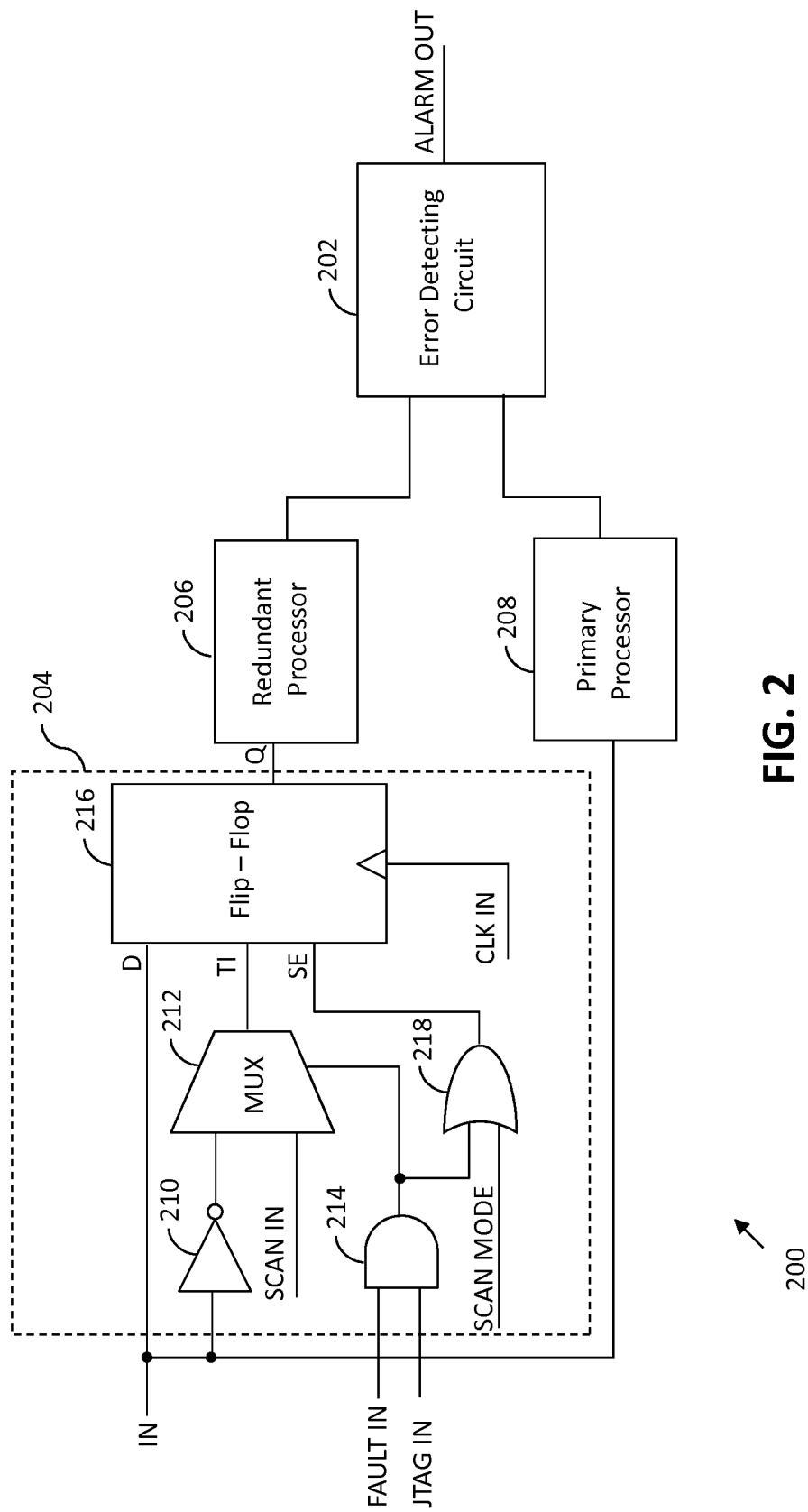
FIG. 2 is a schematic diagram depicting a system for testing an error detection circuit by injecting a fault therein, in accordance with another embodiment of the present invention.

Referring now to FIG. 2, a schematic diagram depicting a system 200 for testing an error detection circuit 202 by injecting a fault therein, in accordance with another embodiment of the present invention, is shown. The system 200 includes a fault-injection unit 204, a redundant processor 206 and a primary processor 208. The fault-injection unit 204 includes a NOT gate 210, a mux 212, an AND gate 214, a flip-flop 216, and an OR gate 218.

An input terminal of the NOT gate 210 receives an input signal. The NOT gate 210 generates an inverted input signal at an output terminal, which is transmitted to a first input terminal of the mux 212. A second input terminal of the mux 212 receives a scan input signal. A select input terminal of the mux 212 is connected to an output terminal of the AND gate 214. The AND gate 214 receives test and fault injection mode signals and generates an input selection signal, which is received at the select input terminal of the mux 212. The mux 212 selects one of the inverted input and scan input signals based on the input selection signal and outputs a selected signal at an output terminal thereof. The output terminal of the mux 212 is connected to a test input terminal of the flip-flop 216 that receives the inverted input signal or the scan input signal from the mux 212. A data input terminal of the flip-flop 216 receives the input signal. Further, a scan enable terminal of the flip-flop 216 is connected to an output terminal of the OR gate 218. A first input terminal of the OR gate 218 is connected to the output terminal of the AND gate 214 for receiving the input selection signal and a second input terminal of the OR gate 218 receives a scan mode enable signal. The OR gate 218 generates a mode selection signal at the output terminal thereof based on the input selection and scan mode enable signals. The OR gate 218 transmits the mode selection signal to the scan enable terminal of the flip-flop 216. A clock input terminal of the flip-flop 216 receives a clock input signal. The flip-flop 216 generates an intermediate signal at an output terminal thereof, which is connected to the redundant processor 206. The intermediate signal is transmitted to the redundant processor 206. The error detection circuit 202 is connected to the redundant processor 206 and receives and processes the intermediate signal to generate a second output signal, which is transmitted to the error detection circuit 202.

The primary processor 208 is connected to the error detection circuit 202 and receives and processes the input signal to generate a first output signal, which is transmitted to the error detection circuit 202. The error detection circuit 202 compares the first and second output signals to generate an error signal when the first and second output signals are not identical.

An external testing apparatus initiates a fault injection mode on the system 200. Upon initiating the test, the external testing apparatus drives the fault injection and test mode signals to logic high state by providing logic high input to a JTAG register (not shown) by way of a JTAG port (not shown) and drives the input selection signal generated by the AND gate 214 to a logic high state, thereby causing the mux 212 to select the inverted input signal. The inverted input signal is transmitted to the test input terminal of the flip-flop 216. The scan mode enable signal is in a logic low state during the fault injection mode. Since the input selection signal is also in a logic high state, the mode selection signal generated by the OR gate 218 is in a logic high state. The mode selection signal by virtue of its logic state causes the flip-flop 216 to capture data input at the test input terminal (i.e., the inverted input signal) instead of capturing the date input at the data input terminal (i.e., the input signal). The flip-flop 216 captures the inverted input signal at a positive or negative edge of the clock input signal, which is output at the output terminal of the flip-flop 216 at a subsequent positive or negative edge of the clock input signal in the form of an intermediate signal.

The intermediate signal is transmitted to the redundant processor 206 that generates the second output signal after processing the intermediate signal. The primary processor 208 is provided with the input signal during the fault injection mode. The primary processor 208 processes the input signal to generate the first output signal. The first and second output signals are transmitted to the error detection circuit 202 by the primary and redundant processors 206 and 204, respectively. The error detection circuit 202 compares the first and second output signals to generate the error signal if the first and second output signals are not identical.

In an embodiment of the present invention, the fault-injection unit 204 is used at different critical stages of the primary and redundant channels to capture faults. The error detection circuit 202 may be a redundancy checker circuit and is used in an automobile safety device. The error detection circuit 202 may also be used in a system that includes primary and redundant channels for ensuring safe operation of the system.

In an embodiment of the present invention, the error detection circuit 202 may be tested by accessing a probe point corresponding to the test input terminal of the flip-flop 216 using a microprobe, before shipping the automobile safety device to consumers. The microprobe alters the logic state of the test input terminal for testing the error detection circuit 202. Since the logic state is changed externally, the NOT gate 210, the mux 212, and the AND gate 214 are not required in the system 200.

Figure 3:
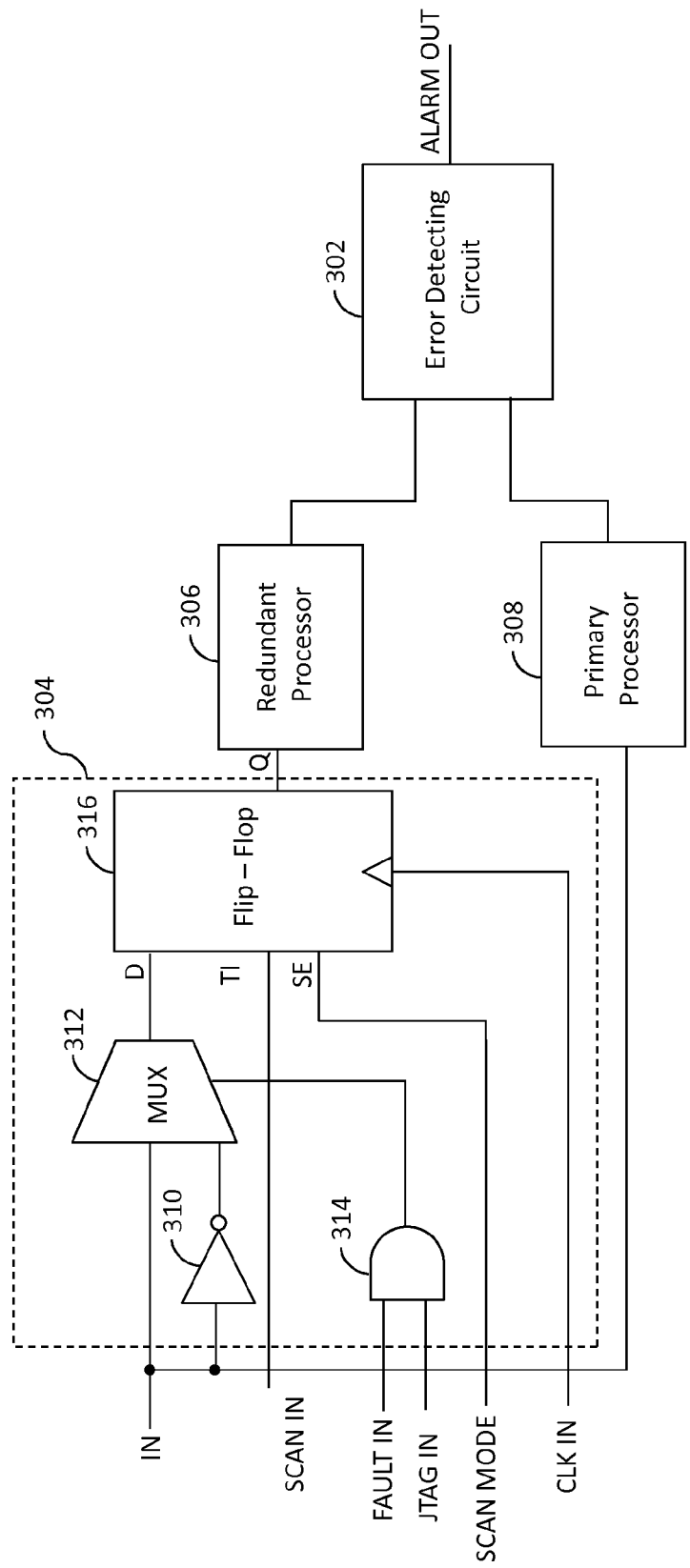
FIG. 3 is a schematic diagram depicting a system for testing an error detection circuit by injecting a fault therein, in accordance with yet another embodiment of the present invention.

Referring now to FIG. 3, a schematic diagram depicting a system 300 for testing an error detection circuit 302 by injecting a fault therein, in accordance with yet another embodiment of the present invention, is shown. The system 300 includes a fault-injection unit 304, a redundant processor 306 and a primary processor 308. The fault-injection unit 304 includes a NOT gate 310, a mux 312, an AND gate 314, and a flip-flop 316.

An input terminal of the NOT gate 310 receives an input signal. The NOT gate 310 generates an inverted input signal at an output terminal thereof. A first input terminal of the mux 312 receives the input signal. A second input terminal of the mux 312 is connected to the output terminal of the NOT gate 310 for receiving the inverted input signal. A select input terminal of the mux 312 is connected to an output terminal of the AND gate 314. The AND gate 314 receives test mode and fault injection mode signals and generates an input selection signal, which is provided to the select input terminal of the mux 312 by the AND gate 314. The mux 312 selects one of the input and inverted input signals based on the input selection signal and outputs a selected signal at an output terminal thereof. A data input terminal of the flip-flop 316 is connected to the output terminal of the mux 312 and receives the input signal or the inverted input signal. A test input terminal of the flip-flop 316 receives a scan input signal and a scan enable terminal of the flip-flop 316 receives a scan mode enable signal. A clock input terminal of the flip-flop 316 receives a clock input signal. The flip-flop 316 generates an intermediate signal and transmits the intermediate signal to the redundant processor 306 by way of an output terminal that is connected to the redundant processor 306. The error detection circuit 302 is connected to the redundant processor 306 and processes the intermediate signal received from the flip-flop 316 to generate a second output signal, which is transmitted to the error detection circuit 302.

The primary processor 308 is connected to the error detection circuit 302 and receives and processes the input signal to generate a first output signal, which is transmitted to the error detection circuit 302. The error detection circuit 302 compares the first and second output signals to generate an error signal when the first and second output signals are not identical.

An external testing apparatus initiates a fault injection mode on the error detection circuit 302 by driving the fault injection and test mode signals to logic high state by providing a JTAG register (not shown) with a logic high input by way of a JTAG port (not shown). This drives the input selection signal to a logic high state and causes the mux 312 to select the inverted input signal. The inverted input signal is transmitted to the data input terminal of the flip-flop 316. Since the fault injection mode is in progress, the scan mode enable signal remains in a logic low state. Thus, the flip-flop 316 captures the inverted input signal provided at the data input terminal thereof, at a positive or negative edge of the clock input signal and transmits the inverted input signal at the output terminal thereof at a subsequent positive or negative edge of the clock input signal in the form of an intermediate signal. The subsequent operation of the system 300 is identical to that of the system 200 (Refer to FIG. 2), and therefore has been omitted for the sake of brevity.

In an embodiment of the present invention, the fault-injection unit 304 may be used at different critical stages of primary and redundant channels to capture faults. The error detection circuit 302 may be a redundancy checker circuit and is used in an automobile safety device. The error detection circuit 302 may also be used in any system that includes primary and redundant channels for ensuring safe operation of the system. The inverted input signal may be provided to the primary processor instead of being provided to the redundant processor. In this case, the redundant processor is provided with the input signal.

In one embodiment of the present invention, the error detection circuit 302 may be tested by accessing a probe point corresponding to the data input terminal of the flip-flop 316 using a microprobe, before shipping the automobile safety device to consumers. The microprobe alters logic state of the data input terminal for testing the error detection circuit 302. Since the logic state is changed externally, the system 300 does not require the NOT gate 310, the mux 312, and the AND gate 314.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for testing an error detection circuit by injecting a fault into the error detection circuit, wherein the error detection circuit receives first and second output signals generated by first and second processors, the system comprising:
   an inverter for receiving an input signal and generating an inverted input signal;
   a first logic gate for receiving test mode and fault injection mode signals and generating an input selection signal based on the test mode and fault injection mode signals; and
   a mux having a first input terminal that receives one of the input signal and a scan input signal, a second input terminal connected to the inverter and receiving the inverted input signal, a select input terminal connected to the first logic gate and receiving the input selection signal, and an output terminal for providing one of the input signal, scan input signal and inverted input signal,
   wherein the mux output terminal is connected to the second processor and the second processor generates the second output signal based on one of the input and inverted input signals, and the first processor generates the first output signal based on the input signal, and
   wherein the error detection circuit receives and compares the first and second output signals from the first and second processors, and generates an error signal based on a result of the comparison.

2. The system of claim 1, further comprising a second logic gate having a first input terminal connected to an output terminal of the first logic gate for receiving the input selection signal and a second input terminal for receiving a scan mode enable signal, wherein the second logic gate generates a mode selection signal.

3. The system of claim 2, further comprising:
   a flip-flop having a data input terminal for receiving the input signal, a test input terminal connected to the output terminal of the mux for receiving the one of the scan input and inverted input signals, a scan enable terminal connected to the second logic gate for receiving the mode selection signal, and an output terminal for providing an intermediate signal to the second processor.

4. The system of claim 3, wherein the second processor generates the second output signal based on the intermediate signal.

5. The system of claim 1, wherein the error detection circuit is a redundancy checker circuit.

6. The system of claim 5, wherein the redundancy checker circuit is a part of an automobile safety device, wherein the redundancy checker circuit is tested during a functional operation of the automobile safety device.

7. The system of claim 1, wherein the test mode signal is a join test action group (JTAG) signal.

8. The system of claim 1, wherein the first processor is a primary processor and the second processor is a redundant processor.

9. The system of claim 1, wherein the inverter comprises a NOT gate and the first logic gate comprises an AND gate.

10. A system for testing an error detection circuit by injecting a fault therein, wherein the error detection circuit receives first and second output signals generated by first and second processors, the error detection circuit comprising:
    a NOT gate for receiving an input signal and generating an inverted input signal;

an AND gate for receiving test mode and fault injection mode signals and generating an input selection signal;

a mux having a first input terminal connected to the NOT gate for receiving the inverted input signal, a second input terminal for receiving a scan input signal, a select input terminal connected to the AND gate for receiving the input selection signal, and an output terminal for providing one of the inverted input and scan input signals;

an OR gate having a first input terminal connected to the AND gate for receiving the input selection signal, a second input terminal for receiving a scan mode enable signal, and an output terminal for providing a mode selection signal; and a flip-flop having a data input terminal for receiving the input signal, a test input terminal connected to the output terminal of the mux for receiving the selected one of the scan input and inverted input signals, a scan enable terminal connected to the OR gate for receiving the mode selection signal, a clock input terminal for receiving a clock input signal, and an output terminal for providing an intermediate signal to the second processor, wherein the second processor generates the second output signal based on the intermediate signal and the first processor generates the first output signal based on the input signal, and wherein the error detection circuit generates an error signal when the first and second output signals are not identical.

11. The system of claim 10, wherein the error detection circuit is a redundancy checker circuit.

12. The system of claim 11, wherein the redundancy checker circuit is a part of an automobile safety device, wherein the system tests the redundancy checker circuit during a functional operation of the automobile safety device.

13. The system of claim 10, wherein the test mode signal is a join test action group (JTAG) signal.

14. The system of claim 10, wherein the first and second processors are at least one of primary and redundant processors.

15. A system for testing an error detection circuit connected to first and second processors, the system comprising:

an inverter for receiving an input signal and generating an inverted input signal;

a first logic gate for receiving test mode and fault injection mode signals and generating an input selection signal;

a mux having a first input terminal for receiving the input signal, a second input terminal connected to the inverter for receiving the inverted input signal, a select input terminal connected to the first logic gate for receiving the input selection signal, and an output terminal for providing one of the input and inverted input signals based on the input selection signal;

a flip-flop having a data input terminal connected to the output terminal of the mux for receiving the one of the input and inverted input signals, a test input terminal for receiving a scan input signal, a scan enable terminal for receiving a scan mode enable signal, and a clock input terminal for receiving a clock input signal, wherein the flip-flop outputs an intermediate signal to the second processor, wherein the first processor generates a first output signal based on the input signal and the second processor generates a second output signal based on the intermediate signal; and wherein the error detection circuit receives and compares the first and second output signals and generates an error signal when the first and second output signals are not identical.

16. The system of claim 15, wherein the first logic gate comprises an AND gate.

17. The system of claim 15, wherein the first and second processors are at least one of primary and redundant processors.

* * * * *